(12) United States Patent
Lee

(10) Patent No.: US 12,326,812 B2
(45) Date of Patent: Jun. 10, 2025

(54) SYSTEM CACHE ARCHITECTURE FOR SUPPORTING MULTIPROCESSOR ARCHITECTURE, AND CHIP

(71) Applicant: Chiplite Technology Co., Ltd., Changzhou (CN)

(72) Inventor: Sheau Jiung Lee, Changzhou (CN)

(73) Assignee: Chiplite Technology Co., Ltd., Changzhou (CN)

( * ) Notice: Subject to any disclaimer, the term of this patent is extended or adjusted under 35 U.S.C. 154(b) by 0 days.

(21) Appl. No.: 18/385,812

(22) Filed: Oct. 31, 2023

(65) Prior Publication Data

US 2024/0289277 A1     Aug. 29, 2024

(30) Foreign Application Priority Data

Feb. 23, 2023    (CN) .......................... 202310153451.8

(51) Int. Cl.
    *G06F 12/0831*     (2016.01)
    *G06F 12/0842*     (2016.01)
    *G06F 12/0846*     (2016.01)

(52) U.S. Cl.
    CPC ...... *G06F 12/0835* (2013.01); *G06F 12/0842* (2013.01); *G06F 12/0848* (2013.01)

(58) Field of Classification Search
    None
    See application file for complete search history.

(56) References Cited

U.S. PATENT DOCUMENTS

| | | | |
|---|---|---|---|
| 6,049,851 | A | 4/2000 | Bryg et al. |
| 11,016,913 | B1 | 5/2021 | Kaushikkar et al. |
| (Continued) | | | |

FOREIGN PATENT DOCUMENTS

| | | |
|---|---|---|
| CN | 102929832 A | 2/2013 |
| CN | 108268384 A | 7/2018 |
| (Continued) | | |

OTHER PUBLICATIONS

Chinese Patent Office, Office Action received in Chinese Patent Application No. 202310153451.8 dated Mar. 28, 2023, 24 pages (including translation).

(Continued)

*Primary Examiner* — Brian R Peugh
(74) *Attorney, Agent, or Firm* — Suiter Swantz IP

(57) ABSTRACT

A system cache architecture for supporting a multiprocessor architecture includes: a snooping pipeline switch, at least two cache segments, a memory request arbiter and a coherent interconnect snooping requester. The snooping pipeline switch is connected to a last level memory bus of at least two processors of the multiprocessor architecture, and forwards a memory read or write request from any processor to a memory system by means of the memory request arbiter or sends the memory read or write request to any one of the at least two cache segments; the coherent interconnect snooping requester sends a snooping read or write request from a DMA master to any two cache segment; the at least two cache segments are configured to in response to concurrent read or write requests from the snooping pipeline switch or from the coherent interconnect snooping requester, feed back or update stored cached data.

20 Claims, 7 Drawing Sheets

(56) References Cited

U.S. PATENT DOCUMENTS

| | | | | |
|---|---|---|---|---|
| 2013/0151929 A1* | 6/2013 | Dodson | ............... | G06F 11/1076 |
| | | | | 714/766 |
| 2017/0185515 A1 | 6/2017 | Fahim et al. | | |
| 2017/0293559 A1 | 10/2017 | Guthrie et al. | | |
| 2022/0224658 A1* | 7/2022 | Jo | ....................... | H04L 49/9021 |

FOREIGN PATENT DOCUMENTS

| | | | |
|---|---|---|---|
| CN | 109952566 A | | 6/2019 |
| CN | 110083548 A | | 8/2019 |
| CN | 115248796 A | | 10/2022 |
| CN | 115408307 A | | 11/2022 |
| CN | 102866923 A | | 1/2023 |
| JP | 2005346581 A | * | 12/2005 |

OTHER PUBLICATIONS

Fei et al., "Combined Method of Dynamic and Static Address Mapping for Shared Last Level Cache of CMP," Computer Science, vol. 39, No. 8, Aug. 2012, 7 pages.

Jun et al., "Algorithm and Realization of Cache Coherence Based on Buses of Snoopy Protocol," Jisuanji Yu Xiandaihua, Oct. 2007, 4 pages.

* cited by examiner

SYSTEM CACHE ARCHITECTURE FOR SUPPORTING MULTIPROCESSOR ARCHITECTURE, AND CHIP

CROSS-REFERENCE TO RELATED APPLICATION

This application claims priority to Chinese Patent Application No. CN202310153451.8, filed on Feb. 23, 2023, the disclosure of which is incorporated herein by reference in its entirety.

TECHNICAL FIELD

Embodiments of the present disclosure relate to chip technology, and in particular to a system cache architecture for supporting a multiprocessor architecture, and a chip.

BACKGROUND

High-performance scaling is a goal of massive multiprocessor architectures in the high-performance computing. A central processing unit (CPU) chiplet is a technical architecture that can effectively scale CPU performance. The Chiplet technology can not only reduce manufacturing costs but also improve computing performance by using multiple small chiplets for chip design. Using CPU clusters can also effectively scale CPU performance. However, in the case where the CPU chiplet architecture and CPU cluster achieve high-performance scaling, the performance of coherent interconnect between multiple CPUs or multiple CPU chiplets is the key to impact fully exerting of the performance.

FIG. 1 shows two systems each having 4 CPU clusters of 32 cores. As shown in FIG. 1, the embedded CPU system is shown on the left, and all CPU clusters are in one system on chip (SOC). The CPU chiplet system is shown on the right, and part or all of the CPUs may be CPU chiplets residing outside the SOC. It can be seen from FIG. 1 that no matter what kind of architecture, the CPUs in the CPU clusters and the CPU chiplets in the CPU chiplet architecture interact with the memory system through a coherent interconnect and interact with the direct memory access (DMA) master by means of the coherent interconnect, such as a peripheral component interconnect express (PCIe) or a compute express link (CLX) or a cache coherent interconnect for accelerators (CCIX).

When the system executes the symmetrical multi-processing (SMP) operating system (OS) kernel, all CPUs need to maintain cache coherency. The mechanism of the cache coherence protocol will determine the performance of the system in executing concurrent multi-threaded tasks. How to address the issue of cache coherence under the multiprocessor architecture is a key factor to realize the high-performance scaling of the multiprocessor architecture.

SUMMARY

A system cache architecture for supporting a multiprocessor architecture and a chip are provided according to embodiments of the present application, which reduces data request interactions between a coherent interconnect and processors, and provides support for high-performance scaling of a multiprocessor architecture.

In a first aspect, a system cache architecture for supporting a multiprocessor architecture is provided according to an embodiment of the present disclosure, which includes: a snooping pipeline switch, at least two cache segments, a memory request arbiter and a coherent interconnect snooping requester.

The snooping pipeline switch is connected to a last level memory bus of at least two processors of the multiprocessor architecture and is configured to forward a memory read or write request from any processor to a memory system by means of the memory request arbiter or send the memory read or write request to any one of the at least two cache segments.

The memory request arbiter is connected to the memory system by a coherent interconnect.

The coherent interconnect snooping requester is connected to a direct memory access (DMA) master by the coherent interconnect, and is configured to send snooping read and write requests from the DMA master to any cache segment of the at least two cache segments.

The at least two cache segments are configured to in response to concurrent read and write requests from the snooping pipeline switch or from the coherent interconnect snooping requester, store cached data corresponding to the memory read and write requests or the snooping read and write requests, and feed back or update stored cached data when the cached data corresponds to a memory read and write request of the memory read and write requests or a snooping read and write request of the snooping read and write requests.

In an alternative implementation of the first aspect, the snooping pipeline switch is further configured to, before forwarding the memory read or write request from any processor to the memory system by means of the memory request arbiter or sending the memory read or write request to any cache segment of the at least two cache segments, determine whether the memory read or write request is in a cacheable cycle; and in a case where the memory read or write request is in a cacheable cycle, send the memory read or write request to any cache segment of the at least two cache segments, or in a case where the memory read or write request is not in the cacheable cycle, forward the memory read and write request to the memory system by means of the memory request arbiter.

In an alternative implementation of the first aspect, in a case where the memory read or write request is a memory read request, the snooping pipeline switch is further configured to query, according to the memory read request from a first processor, corresponding first cached data in the first cache segment; in a case where a cache miss occurs, the snooping pipeline switch is further configured to acquire the corresponding first cached data from the memory system by means of the memory request arbiter and send the corresponding first cached data to the first processor and store the corresponding first cached data into the first cache segment, or in a case where a cache hit occurs, the snooping pipeline switch is further configured to snoop dirty data corresponding to the first cached data from other processors other than the first processor, and in response to the dirty data being detected, send the dirty data to the first processor and refresh data in the first cache segment, and the first processor is any processor in the multiprocessor architecture, and the first cache segment is any idle cache segment of the at least two cache segments.

In an alternative implementation of the first aspect, in a case where when the first cached data corresponding to the memory read request is queried in the first cache segment, the cache hit occurs and the dirty data corresponding to the first cached data is not detected from other processors other than the first processor, the snooping pipeline switch is further configured to send the first cached data in the first cache segment to the first processor.

In an alternative implementation of the first aspect, the in a case where the memory read or write request is a memory write request: in response to determining the memory write request to be a partial write request, the snooping pipeline switch is further configured to store the memory write request in the first cache segment, send a snooping request to other processors other than the first processor to prevent other processors from updating a cache line in which the memory write request is located, and forward the memory write request to the memory system by means of the memory request arbiter; or in response to determining the memory write request to be a full write request, the snooping pipeline switch is configured to directly forward the memory write request to the memory system by means of the memory request arbiter.

In an alternative implementation of the first aspect, the snooping pipeline switch is further configured to, after forwarding the memory write request to the memory system by means of the memory request arbiter, mark the memory write request stored in the first cache segment as dirty data.

In an alternative implementation of the first aspect, in a case where the snooping read or write request is a snooping read request, the first cache segment is configured to, after receiving the snooping read request, determine whether a cache hit occurs for the snooping read request, and in response to a cache miss occurring for the snooping read request, not respond to the snooping read request.

In an alternative implementation of the first aspect, the first cache segment is further configured to, when receiving the snooping read request and determining that the cache hit occurs for the snooping read request, determine whether second cached data corresponding to the snooping read request is dirty data, and in response to determining that the second cached data corresponding to the snooping read request is dirty data, feed back the second cached data and mark the second cached data as clean data; and in response to determining that the second cached data stored in the first cache segment is not dirty data, the first cache segment is further to check, by means of the snooping pipeline switch, dirty data corresponding to the snooping read request in the at least two processors and cache and feed back the dirty data.

In an alternative implementation of the first aspect, the first cache segment is further configured to, when receiving the snooping read request, determining that the cache hit occurs for the snooping read request and determining that the second cached data corresponding to the snooping read request is clean data, feed back the second cached data in case where dirty data corresponding to the snooping read request is not detected in the at least two processors by means of the snooping pipeline switch.

In an alternative implementation of the first aspect, in the case where the snooping read or write request is a snooping write request, the first cache segment is configured to, after receiving the snooping write request, determine whether a cache hit occurs for the snooping read request, and in response to determining that a cache miss occurs for the snooping write request, write the snooping write request into the memory system directory.

In an alternative implementation of the first aspect, the first cache segment is further configured to, when receiving the snooping write request and determining that the cache hit occurs for the snooping read request, in response to determining that the snooping write request is dirty data hit, write snooping write request into the memory system directory; or in response to determining that the snooping write request is clean data hit, send the snooping write request to the at least two processors by means of the snooping pipeline switch.

In an alternative implementation of the first aspect, the first cache segment is further configured to, after writing the snoop write request into the memory system directory or sending the snoop write request to the at least two processors in response to determining that the cache hit occurs for the snooping read request, invalidate the hit cache line.

In an alternative implementation of the first aspect, each cache segment includes a cache, a dual-ported cache tag segment, a processor cache controller and a snooping controller; and the cache is configured to store data, the dual-ported cache tag segment is configured to assign different cache tags for data from the snooping pipeline switch or data from the coherent interconnect snooping requester, the processor cache controller is configured to control a data request from the snooping pipeline switch, and the snooping controller is configured to control data requests from the coherent interconnect snooping requester.

In an alternative implementation of the first aspect, the multiprocessor architecture is a processor cluster including a plurality of processors, or the multiprocessor architecture is a die-to-die interconnected structure including a plurality of CPU chiplets.

In a second aspect, a chip is provided according to an embodiment of the present application, which includes at least two chiplets and the system cache architecture for supporting a multiprocessor architecture according to any possible implementation of the first aspect, and the at least two chiplets are connected to a coherent interconnect by the system cache architecture for supporting a multiprocessor architecture.

In a third aspect, a processor cluster assembly is provided according to an embodiment of the present application, which includes a processor cluster composed of at least two processors and the system cache architecture for supporting a multiprocessor architecture according to any possible implementation of the first aspect. The at least two processors are connected to the coherent interconnect by the system cache architecture for supporting a multiprocessor architecture.

In the system cache architecture for supporting the multiprocessor architecture and the chip according to the embodiments of the present disclosure, an architecture composed of a snooping pipeline switch, at least two cache segments, a memory request arbiter and a coherent interconnect snooping requester is established between a coherent interconnect and multiple processors of the multiprocessor architecture, thereby, in a case where the number of processors in the multiprocessor architecture is large, the system cache architecture for supporting the multiprocessor architecture and the chip are capable of coping with concurrent read and write requests, and avoiding the increased latencies caused by failing to process in time a large number of read and write requests. Moreover, the cached data corresponding to memory read and write requests or snooping read and write requests is stored in the at least two cache segments, and the cached data is fed back or updated when the stored cached data corresponds to a memory read or write request or snooping read or write request, thus, the function of filtering for the snooping requests from the DMA master can be implemented, and the requests of the DMA master to directly snoop the processors by means of the coherent interconnect can be reduced.

DETAILED DESCRIPTION

Figure 1:
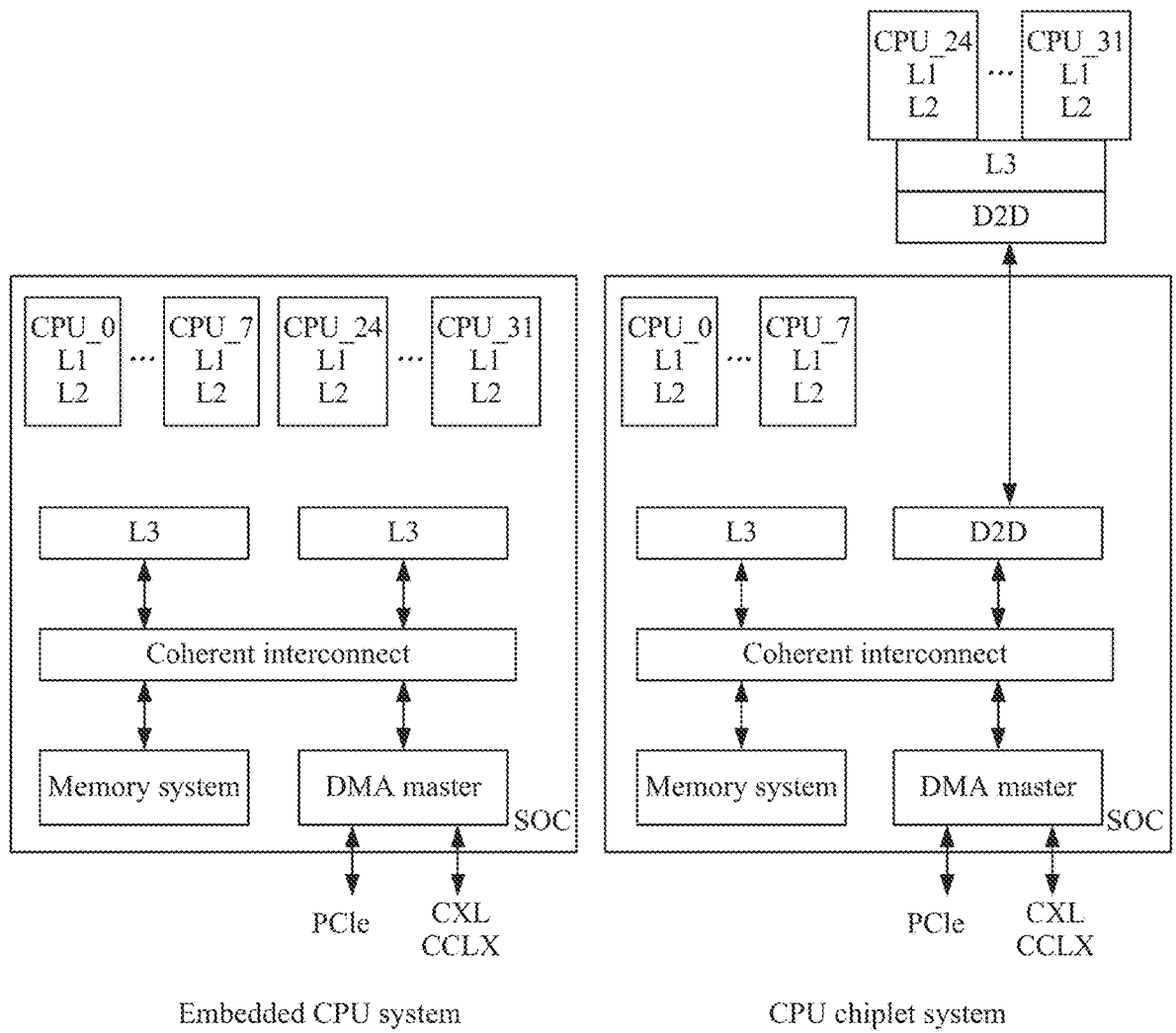
FIG. 1 shows two systems each having 4 CPU clusters of 32 cores.

The present disclosure is further described in detail hereinafter in conjunction with the drawings and embodiments. It is to be understood that the embodiments described here are only intended to explain the present disclosure rather than limiting the present disclosure. In addition, it is to be noted that, for the convenience of description, only some structures related to the present disclosure rather than all structures are shown in the drawings.

As shown in FIG. 1, when the system executes the SMP OS kernel, it is necessary to maintain the cache coherence between all CPUs, and the cache coherence will determine the performance of the system in executing concurrent multi-threaded tasks. There are two types of cache coherence algorithms, one is by snooping algorithm, and the other is directory based algorithm. The advantage of the directory based algorithm is that it reduces bus traffic and is easy to implement in a coherent interconnect. The snooping algorithm requires to snoop all CPUs, and requires a fast response to the snooping. In many existing systems of CPU architectures, the performance of the snooping algorithm has been proven to be higher than the performance of the directory based algorithm. It is proposed in the present application a system cache architecture for supporting a multiprocessor architecture, for example, a system cache architecture for supporting a multiprocessor architecture and having a snoop bus. The architecture has a last level system cache (LLSC) to reduce snooping collisions caused by the coherent interconnect. The LLSC in the system cache architecture for supporting a multiprocessor architecture according to the embodiment of the present application can avoid long latencies in the directory based coherence algorithm, and can also reduce bus traffic similar to the directory based coherence algorithm.

In a CPU cluster or CPU chiplet-based die-to-die structure, the traffic of the private CPU bus after the last level of system cache (such as L3) is low. Through an effective local cache system in each CPU in the CPU cluster, the CPU cluster is required to issue a memory request to the coherent interconnect in merely less than 5% of the CPU cycle. The low bus traffic from the CPU cluster to the coherent interconnect is not the main cause of the performance degradation, the root cause of the performance degradation is the latency to get the required memory by the CPU cluster through the coherent interconnect. The snooping algorithm forwards and broadcasts the memory snooping request to all CPU clusters, and the memory snooping request from the CPU clusters likely collides with a memory snooping request from other memory masters within a coherent interconnect, especially DMA masters, such as PCIe, graphics processing unit (GPU), etc. The DMA master has a different memory access pattern from that of a CPU cluster. In a typical system, CPU clusters access the memory by one cache line with 64 bytes each time, and a DMA master accesses the memory by a block with 2K/4K bytes each time. When the memory request from the CPU cluster collides with the memory request from the DMA master, the snooping latency can become very long. The coherent interconnect cannot efficiently support two different kinds of memory access patterns, namely fast response and long memory transfer.

The above content is described by taking the CPU cluster as an example, but the CPU chiplet based D2D architecture also has the above issues due to the existence of multiple chiplets.

Figure 2:
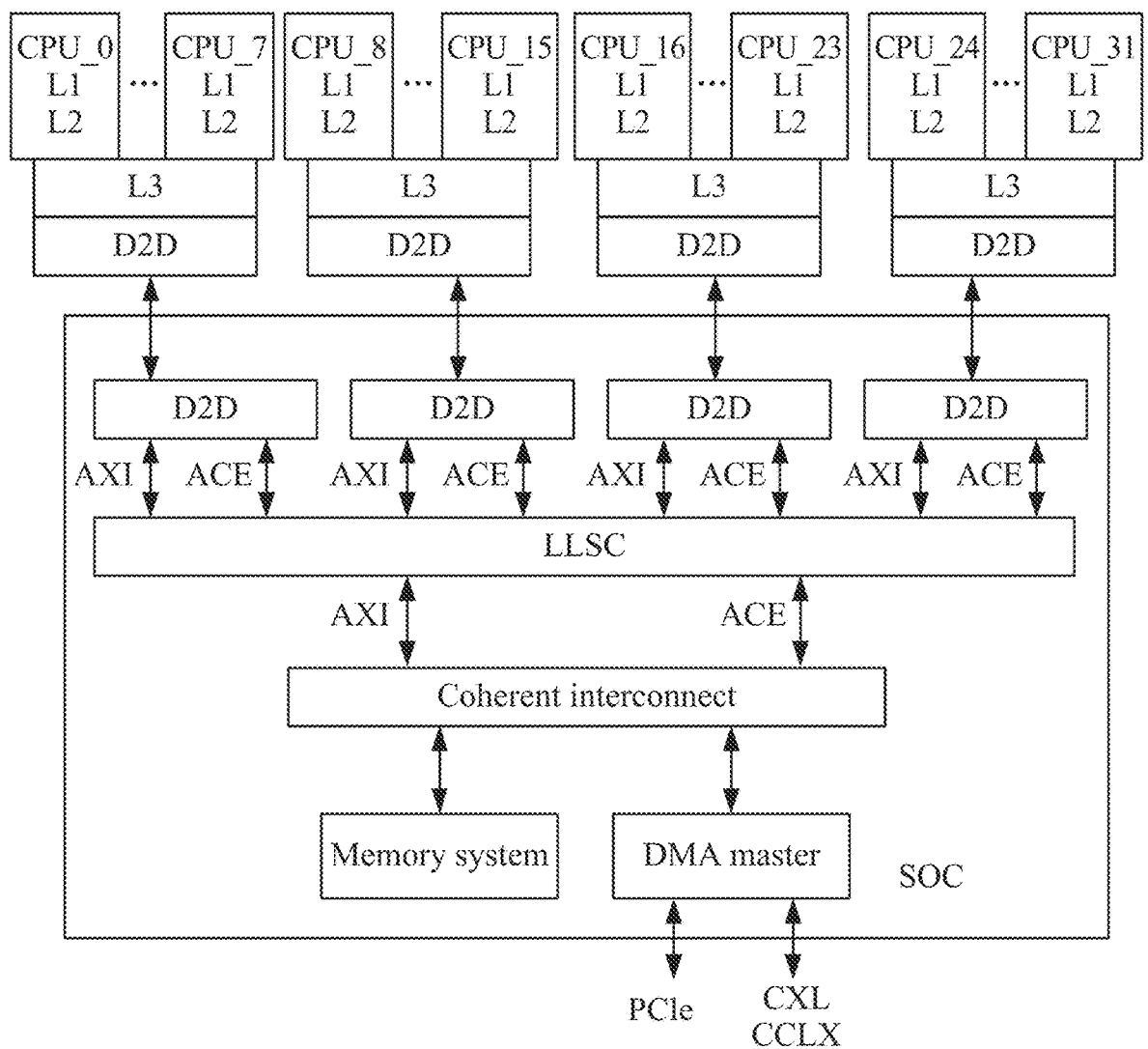
FIG. 2 is a schematic diagram showing the application, in a system, of a system cache architecture for supporting a multiprocessor architecture according to the present application.

In order to address the above issue, in this application, it is proposed to implement a last level system cache (LLSC) between the CPU cluster (or CPU chiplet) and the coherent interconnect to isolate two different patterns of memory accessing, namely fast response and long memory transfer. As shown in FIG. 2, FIG. 2 is a schematic diagram showing the application, in a system, of a system cache architecture for supporting a multiprocessor architecture according to the present application. In FIG. 2, the CPU chiplet based architecture is taken as an example, the system includes a cluster composed of 32 chiplets, each 8 chiplets of the 32 chiplets are located in one SOC and have one last level memory bus (L3). The LLSC is connected to the chiplets through D2D connection and by means of an advanced extensible interface (AXI)/AXI coherency extensions (ACE) bus. In addition, the LLSC is connected to the coherent interconnect by the AXI/ACE bus and further connected to the memory system and the DMA master, where the AXI bus is a memory bus for reading/writing the memory, and the ACE bus is a snooping bus for cache coherency. The AXI/ACE bus in FIG. 1 is only a schematic illustration, and it can also be implemented by using other buses. The LLSC in FIG. 2 is just the system cache architecture for supporting a multiprocessor architecture according to this application. Compared with the system architecture shown in FIG. 1, in this application, the LLSC architecture is added between the coherent interconnect and the CPU clusters. FIG. 2 shows that the LLSC is located in the same SOC as the coherent interconnect, the memory system, and the DMA master, but the LLSC may also be deployed in other locations, for example in a separate SOC. The system cache architecture for supporting a multiprocessor architecture according to the embodiment of the present application is the LLSC. The LLSC performs snooping filtering to prevent the DMA long memory from accessing the local cache bus of the terminal CPU cluster. Since the coherent interconnect is subjected to fewer interrupts, the snooping response between CPU clusters will be faster, then as the number of CPUs in the CPU clusters increases, the performance of the CPU clusters will be highly scaled.

Figure 3:
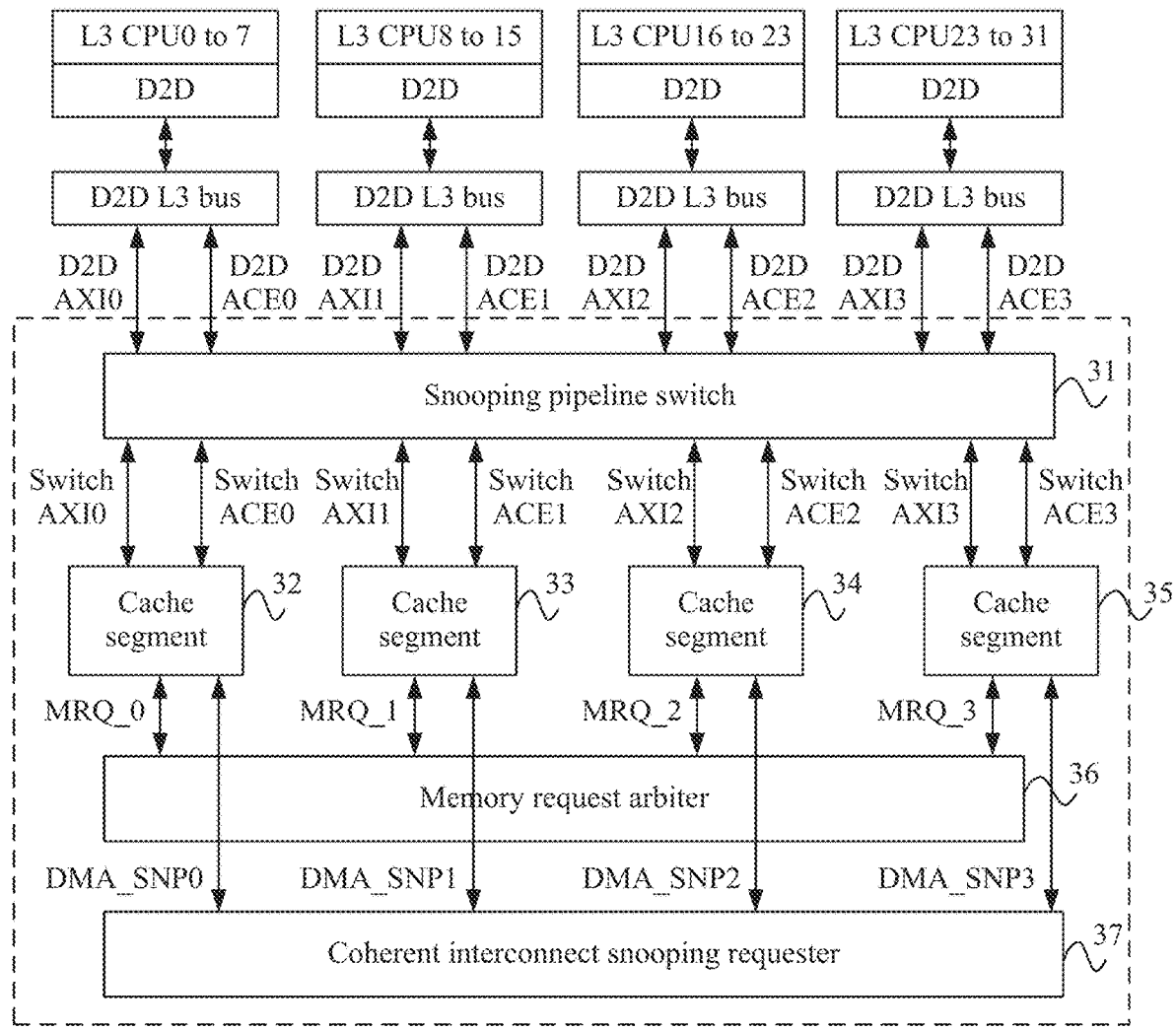
FIG. 3 is a schematic structural diagram of a system cache architecture for supporting a multiprocessor architecture according to an embodiment of the present application.

FIG. 3 is a schematic structural diagram of a system cache architecture for supporting a multiprocessor architecture according to an embodiment of the present application. As shown in FIG. 3, the system cache architecture for supporting a multiprocessor architecture according to the embodiment of the present application includes a snooping pipeline switch 31, at least two cache segments 32-35, a memory request arbiter 36 and a coherent interconnect snooping requester 37.

The snooping pipeline switch 31 is connected to a last level memory bus (L3 bus) of at least two processors of the multiprocessor architecture, and is configured to forward a memory read or write request from any processor to a memory system by means of the memory request arbiter 36 or send the memory read or write request to any one of the at least two cache segments. The memory request arbiter 36 is connected to the memory system by a coherent interconnect. The coherent interconnect snooping requester 37 is connected to a DMA master by the coherent interconnect, and is configured to send snooping read and write requests from the DMA master to any cache segment of the at least two cache segments. The at least two cache segments are configured to in response to concurrent read and write requests from the snooping pipeline switch 31 or from the coherent interconnect snooping requester 37, store cached data corresponding to the memory read and write requests or the snooping read and write requests, and feed back or update stored cached data when the cached data corresponds to a memory read and write request of the memory read and write requests or a snooping read and write request of the snooping read and write requests. In FIG. 3, the CPU chiplet-based architecture is taken as an example for illustration.

The snooping pipeline switch 31 is a port to which the CPU clusters are connected. The snooping pipeline switch 31 completely copies the last level memory bus of the CPU chiplet to the LLSC by a pair of D2D pipelines. As shown in the figure, the snooping pipeline switch 31 is connected to the CPU chiplet through a D2D AXI bus and a D2D ACE bus, and the snooping pipeline switch 31 is connected to the cache segments through a switch AXI bus and s switch ACE bus.

The memory request arbiter 36 serves as an interface between the system memory and the cache segments, and is connected to the cache segments through memory request buses (MRQ).

The coherent interconnect snooping requester 37 serves as an interface between the DMA master and the cache segments, and is connected to the cache segments through snoop buses (DMA SNP).

At least two cache segments are configured to respond to concurrent read and write requests from the snooping pipeline switch 31 or the coherent interconnect snooping requester 37, that is to say, multiple cache segments are set for being capable of coping with concurrent read and write requests and avoiding the increased latencies caused by failing to process in time a large number of read and write requests in a case where the number of processors in the multiprocessor architecture is large. Moreover, the cached data corresponding to memory read and write requests or snooping read and write requests is stored in the at least two cache segments, and the cached data is fed back or updated when the stored cached data corresponds to a memory read or write request or snooping read or write request, thus, the function of filtering for the snooping requests from the DMA master can be implemented, and the requests of the DMA master to directly snoop the processors by means of the coherent interconnect can be reduced.

In the system cache architecture for supporting the multiprocessor architecture according to the embodiment, an architecture composed of a snooping pipeline switch, at least two cache segments, a memory request arbiter and a coherent interconnect snooping requester is established between a coherent interconnect and multiple processors of the multiprocessor architecture, thereby, in a case where the number of processors in the multiprocessor architecture is large, the system cache architecture for supporting the multiprocessor architecture is capable of coping with concurrent read and write requests, and avoiding the increased latencies caused by failing to process in time a large number of read and write requests. Moreover, the cached data corresponding to memory read and write requests or snooping read and write requests is stored in the at least two cache segments, and the cached data is fed back or updated when the stored cached data corresponds to a memory read or write request or a snooping read or write request, thus, the function of filtering for the snooping requests from the DMA master can be implemented, and the requests of the DMA master to directly snoop the processors by means of the coherent interconnect can be reduced.

In FIG. 3, four cache segments including a cache segment 32, a cache segment 33, a cache segment 34 and a cache segment 35 are taken as an example, the number of cache segments can be set according to practical requirements. The connection relationship between the components in the system cache architecture for supporting a multiprocessor architecture is as shown in the figure.

Figure 4:
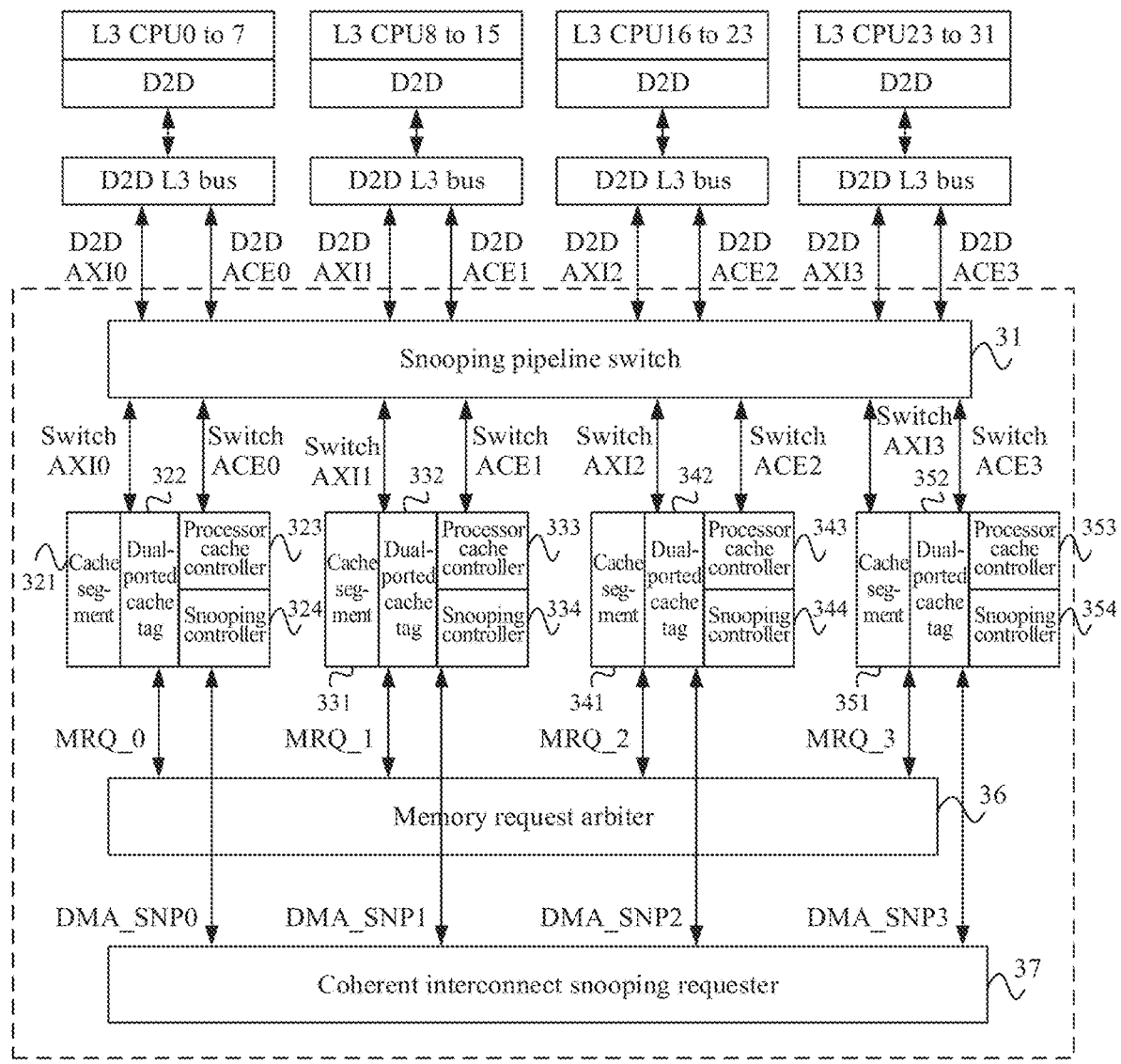
FIG. 4 is a schematic structural diagram of another system cache architecture for supporting a multiprocessor architecture according to an embodiment of the present application.

FIG. 4 is a schematic structural diagram of another system cache architecture for supporting a multiprocessor architecture according to an embodiment of the present application. FIG. 4 further shows the specific structures of the cache segments according to this embodiment on the basis of the structure of the system cache architecture for supporting a multiprocessor architecture in FIG. 3. Each cache segment includes a cache, a dual-ported cache tag segment, a processor cache controller, and a snooping controller. All the cache segments have the same structure.

As shown in FIG. 4, the cache segment 32 includes a cache 321, a dual-ported cache tag segment 322, a processor cache controller 323 and a snooping controller 324. The cache segment 33 includes a cache 331, a dual-ported cache tag segment 332, a processor cache controller 333 and a snooping controller 334. The cache segment 34 includes a cache 341, a dual-ported cache tag segment 342, a processor cache controller 343 and a snooping controller 344. The cache segment 35 includes a cache 351, a dual-ported cache tag segment 352, a processor cache controller 353 and a snooping controller 354.

The cache segment 32 is taken as an example, the cache 321 is configured to store data including data from the snooping pipeline switch 31 or data from the coherent interconnect snooping requester 37. The dual-ported cache tag segment 322 is configured to assign different cache tags for data from the snooping pipeline switch 31 or data from the coherent interconnect snooping requester 37, and to assign different cache tags for data requests from different sources, which can realize the concurrency of the data request from the snooping pipeline switch 31 and the data request from the coherent interconnect snooping requester 37, and avoid collisions between the coherent interconnect and the local bus of processors, thereby shortening memory read and write latencies. The processor cache controller 323 is configured to control the data request from the snooping pipeline switch 31, and the snooping controller 324 is configured to control the data request from the coherent interconnect snooping requester 37.

In FIG. 4, it is taken as an example that each CPU of the CPU chiplet architecture has an 8 M byte L3 cache bus. The cache in each cache segment is a 32 M byte static random-access memory (SRAM). Assuming that the L3 cache bus of each CPU is an 8 M byte four-way associative cache, the L3 tag (TAG) entry will be A [20:6], and the cache TAG is A [39:21]. If each cache segment is a 32 M byte four-way associative cache, the TAG entry will be A [22:6], the cache segment entry will be A [24:23], and the cache TAG will be A [39:25].

The performance of the snooping pipeline switch 31 will impact the performance scaling of multiple processors in the multiprocessor architecture. A processing flow when the system cache architecture for supporting a multiprocessor architecture according to the embodiment of the present application performs specific read and write requests is further described in detail hereinafter.

First, the system cache architecture for supporting a multiprocessor architecture according to the embodiment of the present application can process memory read and write requests from the snooping pipeline switch 31, and the memory read and write requests include memory read requests or memory write requests.

The snooping pipeline switch 31 is further configured to, before forwarding a memory read or write request from any processor to a memory system by means of the memory request arbiter 36 or before sending the memory read or write request to any cache segment of the at least two cache segments, determine whether the memory read or write request is in a cacheable cycle, and if the memory read or write request is in a cacheable cycle, send the memory read or write request to any cache segment of the at least two cache segments, and if the memory read or write request is not in a cacheable cycle, forward the memory read or write request to the memory system by means of the memory request arbiter 36. That is to say, after acquiring the memory read or write request from any processor, the snooping pipeline switch 31 first determines whether the request read or write cycle is a cacheable cycle, and if the request read or write cycle is not a cacheable cycle, the snooping pipeline switch 31 will bypass the cache segment and forward the memory read or write request directly to the memory system by means of the memory request arbiter 36. If the request read and write cycle is a cacheable cycle, any cache segment is selected to perform processing for the memory read or write request.

If the memory read or write request is a memory read request, the snooping pipeline switch 31 queries, according to the memory read request from a first processor, corresponding first cached data in the first cache segment. The first processor is any processor in the multiprocessor architecture, the first cache segment is any idle cache segment of the at least two cache segments, and the idle cache segment means a cache segment that is not occupied. If the cache miss occurs, that is, the data corresponding to the memory read request is not cached in the first cache segment, the snooping pipeline switch 31 acquires first cached data corresponding to the memory read request from the memory system by means of the memory request arbiter 36 and sends the corresponding first cached data to the first processor and stores the corresponding first cached data into the first cache segment. If the cache hit occurs, it means that the first cached data corresponding to the memory read request is cached in the first cache segment. In this case, it is further required to consider whether the data cached in the first cache segment is dirty data. Dirty data represents the latest data. Since the processors in the multiprocessor architecture may perform concurrent data read requests, multiple processors may concurrently request to read the same data, and in this case, the data read request may correspond to multiple pieces of data, therefore, it is necessary to snoop the dirty data corresponding to the first cached data from processors other than the first processor. If the dirty data corresponding to the first cached data is detected in other processors other than the first processor, the dirty data is sent to the first processor and data in the first cache segment is refreshed. In this way, it enables to read the latest data for the data read request sent by the first processor.

If the cache hit occurs when the first cached data corresponding to the memory read request is queried in the first cache segment according to the memory read request from the first processor, and the dirty data corresponding to the first cached data is not detected from other processors other than the first processor, the snooping pipeline switch 31 sends the first cached data in the first cache segment to the first processor. That is to say, if the cache hit occurs in the first cache segment and the corresponding dirty data is not detected in other processors other than the first processor, the first cached data stored in the first cache segment is dirty data, that is, the latest data, and can be sent directly to the first processor.

If the memory read or write request is a memory write request, the memory write request includes a partial write request or a full write request, indicating whether the memory write request occupies the full memory cycle. The snooping pipeline switch 31, if determining that the memory write request is a partial write request, stores the memory write request in the first cache segment, and sends a snooping request to other processors other than the first processor to prevent other processors from updating a cache line in which the memory write request is located and forwards the memory write request to the memory system by means of the memory request arbiter 36. That is, when the memory write request sent by the first processor is a partial write request and does not occupy a full memory cycle, in order to avoid collisions of concurrent other memory read and write requests with this memory write request, the snooping pipeline switch 31 sends a snooping request to other processors to prevent the cache line in which the memory write request is located from being used by other processors. The snooping pipeline switch 31, if determining that the memory write request is a full write request, directly forwards the memory write request to the memory system by means of the memory request arbiter 36, thus, if the memory write request is a full write request, the cache line in which the memory write request is located will not be occupied by other processors.

In addition, the snooping pipeline switch 31, after forwarding the memory write request to the memory system by means of the memory request arbiter 36, further marks the memory write request stored in the first cache segment as dirty data.

In addition, the system cache architecture for supporting a multiprocessor architecture according to the embodiment of the present application can further process a snooping read or write request from the coherent interconnect snooping requester 37, and the snooping read or write request includes a snooping read request or a snooping write request.

In a case where the snooping read or write request is a snooping read request, the first cache segment, after receiving the snooping read request, is configured to determine whether the cache hit occurs for the snooping read request, and not respond to the snooping read request if the cache miss occurs for the snooping read request. That is to say, if the data corresponding to the snooping read request is not cached in the first cache segment, the first cache segment will not respond to the snooping read request, and the local cache buses of the processors in the multiprocessor architecture will not be interrupted.

The first cache segment is further required to, when receiving the snooping read request and if determining that the cache hit occurs for the snooping read request, that is, the data corresponding to the snooping read request has been stored in the first cache segment, determine whether second cached data corresponding to the snooping read request is dirty data, and if determining that the second cached data corresponding to the snooping read request is dirty data, feed back the second cached data and mark the second cached data as clean data. That is to say, if the second cached data corresponding to the snooping read request has been stored in the first cache segment, and is the latest data, the data is fed back to the request terminal of the snooping read request, and the data, since having been read, needs to be marked as clean data. If determining that the second cached data stored in the first cache segment is not dirty data, the first cache segment is required to check, by means of the snooping pipeline switch 31, dirty data corresponding to the snooping read request in the at least two processors and cache and feed back the dirty data if there is any. In this way, it is possible to avoid to the greatest extend the disturbing caused by the data requests from the coherent interconnect to the local cache bus of the processors of the multiprocessor architecture.

The first cache segment is further configured to, when receiving the snooping read request, determining that the cache hit occurs for the snooping read request, and determining that the second cached data corresponding to the snooping read request is clean data, feed back the second hatched data if dirty data corresponding to the snooping read request is not detected in the at least two processors by means of the snooping pipeline switch 31. That is to say, although the second cached data stored in the first cache segment is clean data, the dirty data corresponding to the snooping read request is not found in the processors, and thus, the second cached data is directly fed back.

In the case where the snooping read or write request is a snooping write request, the first cache segment, after receiving the snooping write request, first determines whether the cache hit occurs for the snooping read request, and if the first cache segment determines that the cache miss occurs for the snooping write request, the snooping write request is written into the memory system directory.

When receiving the snooping write request and determining that the cache hit occurs for the snooping read request, the first cache segment is further configured to, in response to determining that the snooping write request is dirty data hit, write the snooping write request into the memory system directory, or in response to determining that the snooping write request is clean data hit, send the snooping write request to the at least two processors by means of the snooping pipeline switch 31. Snooping write requests may also be concurrent, so the snooping write requests may also have dirty data. If a snooping write request is dirty data, it means the snooping write request is an exclusive cache line, then the first cache segment will write the snooping write request directly into the memory system directory without disturbing the local cache buses of the processors and then invalidate the cache line. If a snooping write request is clean data, the snooping write request may be a shared cache line, and in this case, the snooping write request is sent to the processors through the snooping pipeline switch 31.

The first cache segment is further configured to, when determining that the cache hit occurs for the snooping read request, write the snooping write request into the memory system directory or send the snooping write request to the at least two processors, and after that, invalidate the hit cache line after.

The system cache architecture for supporting a multiprocessor architecture shown in FIG. 2 to FIG. 4 above can serve a processor cluster composed of multiple processors, or a D2D interconnected structure composed of multiple CPU chiplets.

The system cache architecture for supporting a multiprocessor architecture according to an embodiment of the present application is further described hereinafter with several embodiments.

Figure 5:
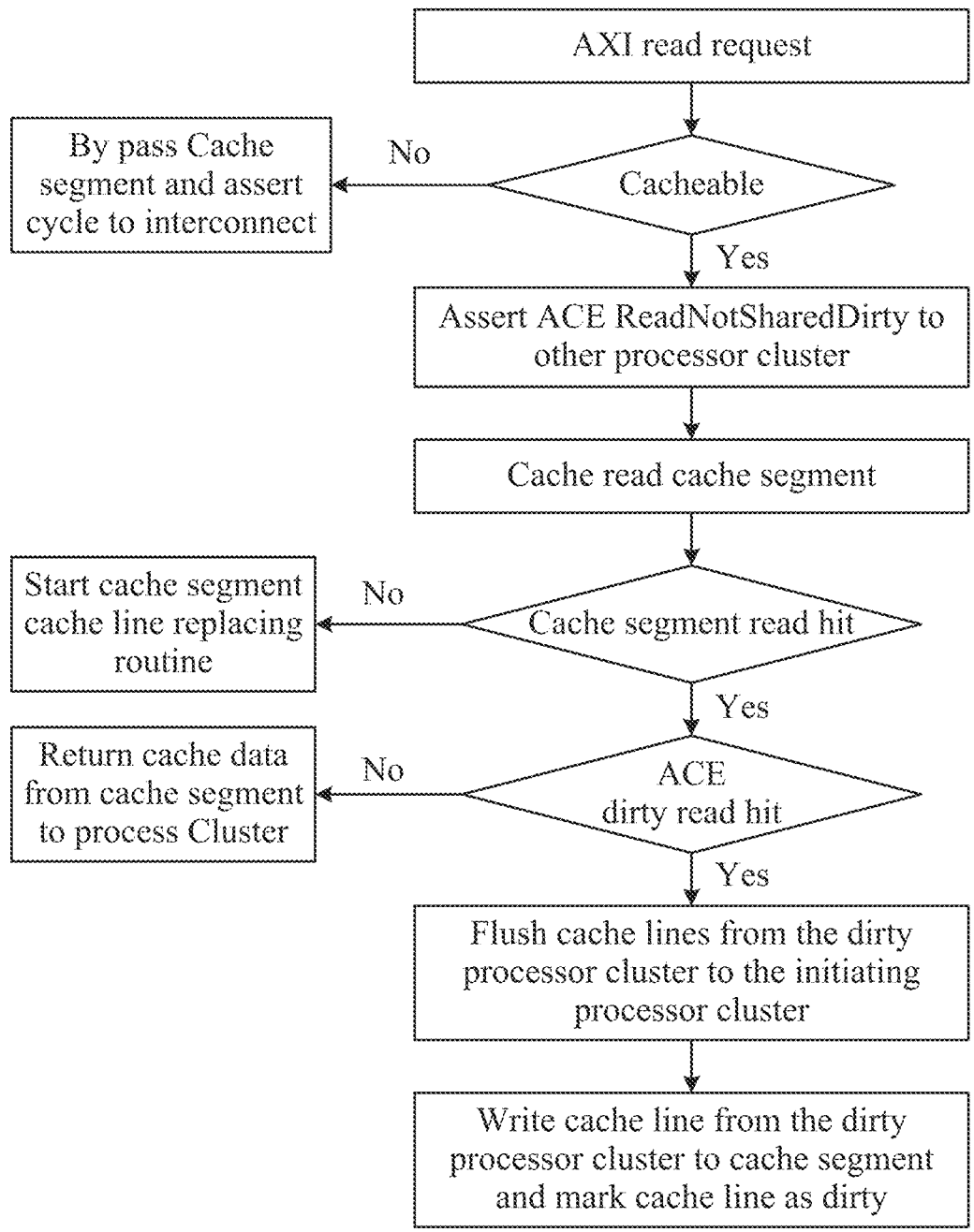
FIG. 5 is a flow chart showing a system cache architecture for supporting a multiprocessor architecture performing AXI memory reading according to an embodiment of the present application.

FIG. 5 is a flow chart showing a system cache architecture for supporting a multiprocessor architecture performing AXI memory reading according to an embodiment of the present application. As shown in FIG. 5, for a memory read request from a processor, first the snooping pipeline switch checks if the request read cycle is a cacheable cycle. If the request read cycle is not a cacheable cycle, the snooping pipeline switch will directly forward the memory read request to the coherent interconnect without checking each cache segment. If the request read cycle is a cacheable cycle, the snooping pipeline switch will execute the next bus operation. When the request read cycle is a cacheable cycle, the cycle is a cache miss cycle from the last level memory bus of a multiprocessor architecture. The last level memory bus of the multiprocessor architecture must fetch a new cache line no matter it is a read miss or a write miss. Thus, the snooping pipeline switch asserts a snooping cycle ReadNotShareDirty to other processors of the multiprocessor architecture. Simultaneously, the snooping pipeline switch also asserts a cache read cycle to any of the cache segments. According to the principle of cache inclusion, the at least two cache segments should contain all current cache residing on all the processors. The snooping pipeline switch first checks the result from the dual-ported cache tag segments in the cache segments. If it is cache miss, the snooping pipeline switch asserts an AXI memory read cycle to the coherent interconnect to fetch the desired cache line from the system memory. This is because the cache segments having a cache miss may imply that other processors will not have the desired cache line due to the cache inclusion principle. If there is a cache hit from the cache segments, the snooping pipeline switch will check next the snooping response for any dirty cache line exiting in other processors. If there is no dirty cache line existing in other processors, the snooping pipeline switch returns the cache line from the cache segments to the processor cluster that initiated the memory read request and completes the cycle. If one of the processor clusters returns a snooping response of dirty cache line existing, the snooping pipeline switch will wait for the processor cluster to flush out the dirty cache line. When the snooping pipeline switch receives the dirty cache line, the snooping pipeline switch returns the dirty cache line to the processor cluster that initiated the memory read request. The snooping pipeline switch concurrently asserts a cache write to update the cache line in the cache segments. After executing these two bus cycles, the snooping pipeline switch completes the memory read of the processors. When the cache segments have a cache miss, it needs to replace a cache line. When any cache segment replaces an existing cache line, the cache segment must issue a readUnique to the replaced cache line. In this case, all other processor clusters will not contain the data of replaced cache (if there is any). This is the way to execute the cache inclusion principle, and the processor cluster will flush out the dirty data if there is dirty data in the cache line.

Figure 6:
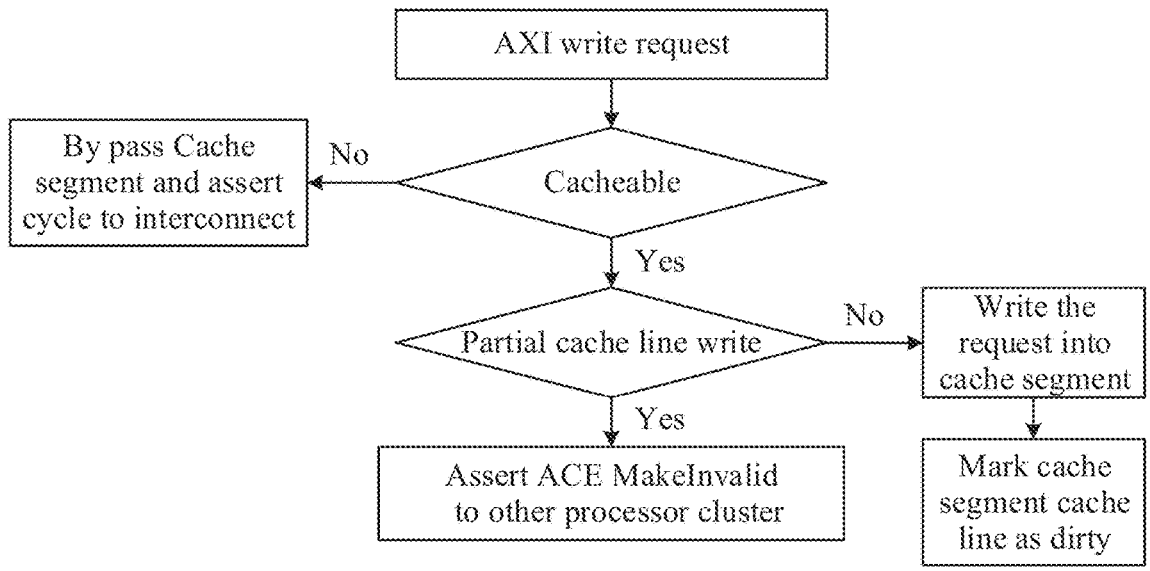
FIG. 6 is a flow chart showing a system cache architecture for supporting a multiprocessor architecture performing AXI memory writing according to an embodiment of the present application.

FIG. 6 is a flow chart showing a system cache architecture for supporting a multiprocessor architecture performing AXI memory writing according to an embodiment of the present application. As shown in FIG. 6, the snooping pipeline switch will check whether the memory write cycle is a cacheable cycle. If the memory write cycle is not a cacheable cycle, the snooping pipeline switch will forward the memory write directly to the coherent interconnect without checking the cache segments. If the memory write cycle is a cacheable read cycle, the snooping pipelined switch port will perform the next bus operation. When the memory write cycle is a cacheable cycle, the write cycle is a dirty cache line flush during cache replacement or a write hit broadcast due to a write hit on the shared state. The dirty cache line flush must be a write cycle with a full cache line, which normally has 64 bytes. For a write hit on a shared cache line, the write cycle must be a partial write cycle, which normally has 8 bytes for a 64-bit processor. Once the snooping pipeline switch detects a cacheable write, the next step is to detect whether it is a partial cache line write cycle. If it is a partial cache line write, the snooping pipeline switch will issue a snooping request MakeInvalid to the shared cache line on all other processor clusters. This makes that no other shared cache can be updated, and the processor cluster that initiated the memory write request keeps the latest data and marks the cache line as dirty and unique. It is not required to do any cycle to the cache segment when it is a partial cache line write. Any of the cache segments still contains the cache line, but the latest update data is in the processor cluster. If it is a full cache line write, it must be due to the flushing the dirty cache line. In the cache algorithm, only one dirty cache line can exist among all processor clusters in a multiprocessor architecture. Therefore, dirty cache line flush should not involve any snooping in other processors. Thus, the snooping pipeline switch will assert a memory write to the cache segments and mark the cache line in the cache segments as a dirty cache line.

Figure 7:
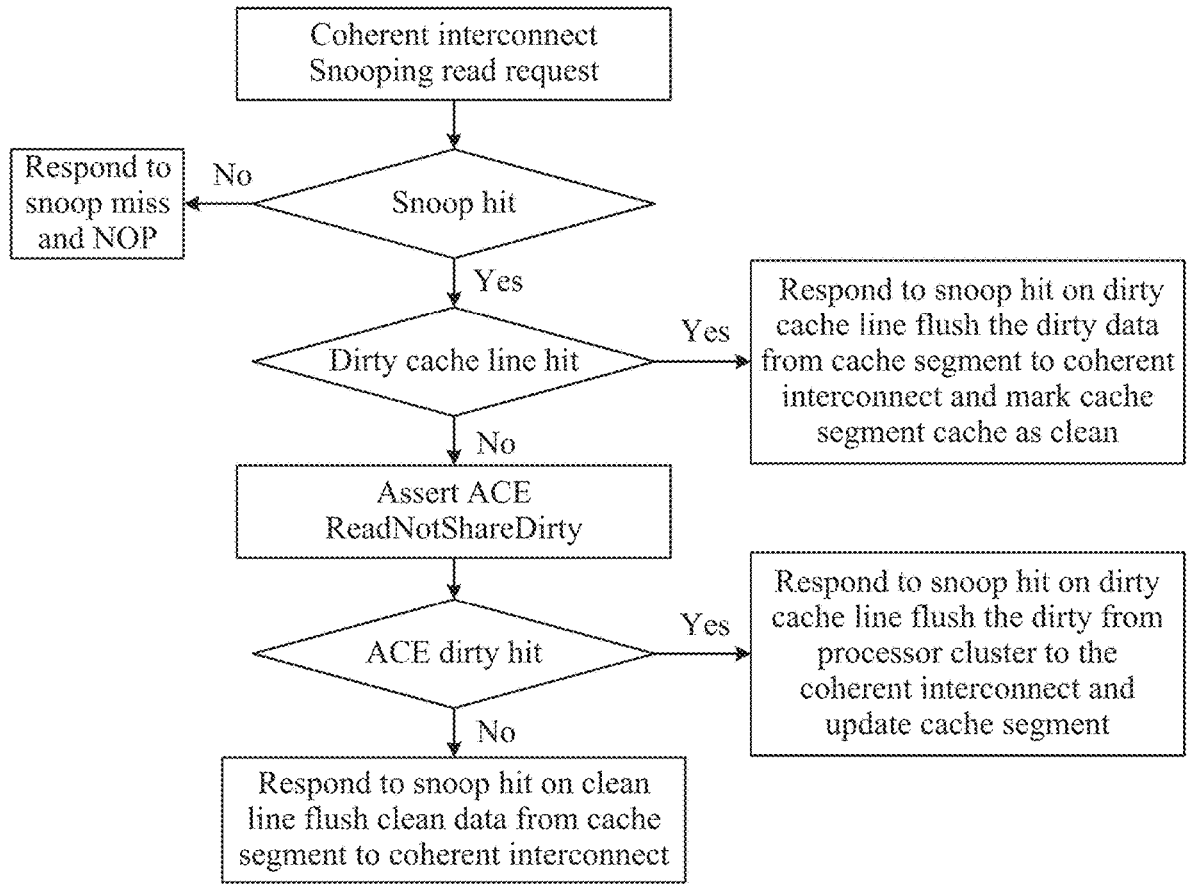
FIG. 7 is a flow chart showing a system cache architecture for supporting a multiprocessor architecture responding to a snooping read request from a DMA master according to an embodiment of the present application.

FIG. 7 is a flow chart showing a system cache architecture for supporting a multiprocessor architecture responding to a snooping read request from a DMA master according to an embodiment of the present application. As shown in FIG. 7, when the DMA master accesses the cacheable memory space, the bus line transfer cycle should be based on one cache line for every transfer. For example, for a DMA master transferring 1K byte, the DMA master should assert 16 transfers of 64 byte for every transfer. This is to ensure an efficient interaction between the coherent interconnect, cache segments and DRAM. The coherent interconnect should convert the snooping read request from the DMA master to be aligned with 64 byte boundary cache line read. When a cache segment receives a snooping read request, the coherent interconnect can snoop the cache segment by means of its dual-ported cache tag segment without interrupting the processor cluster local bus. The cache segment will check its dual-port cache comparison result from snooping read request. If it is a snoop miss, the cache segment will respond to the coherent interconnect as a snoop miss, then there is no operation and the coherent interconnect does not interrupt the processor cluster local bus. If it is a snoop hit, the cache segments check whether this is a dirty cache line hit. Since the system only allows one copy of dirty data within the whole cache system, the rest of the processor cluster with the same cache tag should be left in an invalid state. The cache segments will flush the dirty cache line to the coherent interconnect and mark the cache line as clean, this operation does not interrupt the processor cluster local bus either. If this is a clean hit on the cache segments, the cache segments need to check whether there is a dirty cache line on the processor. The cache segments will forward snooping of ReadNotSharedDirty to the snooping pipeline switch. The snooping pipeline switch will further perform snooping inquiry on all processors. If all the processor clusters respond no dirty cache line on their local caches, the cache segments return their cache lines to the coherent interconnect. If one processor cluster makes a response to a dirty cache line flush, the snooping pipeline switch returns the dirty cache line to the coherent interconnect at the time it updates the cache segment cache line, thereby completing the snooping read operation.

Figure 8:
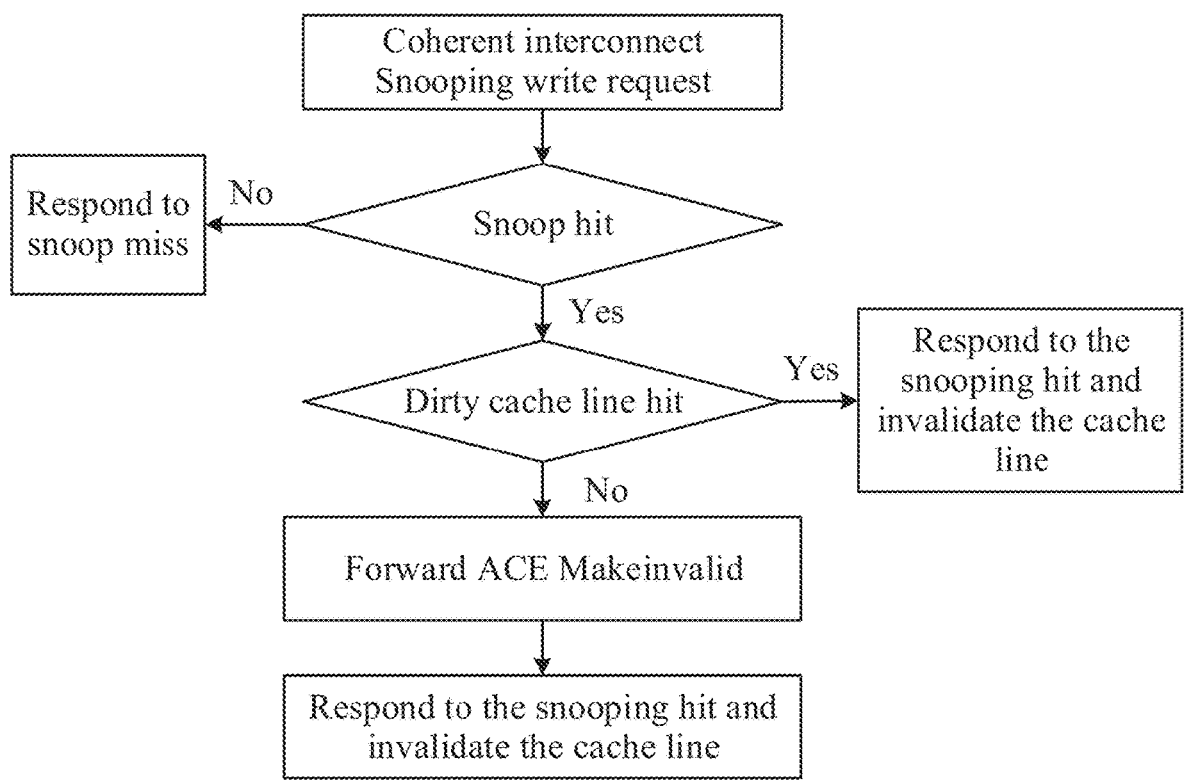
FIG. 8 is a flow chart showing a system cache architecture for supporting a multiprocessor architecture responding to a snooping write request from a DMA master according to an embodiment of the present application.

FIG. 8 is a flow chart showing a system cache architecture for supporting a multiprocessor architecture responding to a snooping write request from a DMA master according to an embodiment of the present application. As shown in FIG. 8, when any of the cache segments receives a snooping write request, the coherent interconnect can snoop the cache segment by means of its dual-ported cache segment cache tag without interrupting the processor local bus. If there is a snoop miss on the cache segment cache, the cache segment may make a response to the snoop miss and the coherent interconnect will write to the system memory directory without disturbing the processor cluster local bus. If there is a snoop hit on the cache segment, the cache segment makes a response to the snoop hit. The cache segment will further identify whether it is a dirty cache line hit. Since the coherent interconnect will convert all partial writes or unaligned writes into aligned and cache line burst writes, the coherent interconnect will snoop and invalidate the cache in the cache segment. If the snoop hit on the cache segment is a dirty cache line, it implies this is an exclusive cache line, so that the cache segment will invalidate the cache line without disturbing the processor cluster local bus. If the snoop hit on the cache segment is a clean cache line, there may be shared cache lines in other processors, thus the cache segment will assert MakeInvalid to the snooping pipeline switch and forward it to all processors. The cache segment also invalidates the cache line. This completes the snooping write operation when the DMA master asserts the DMA write cycle to the coherent interconnect.

In FIG. 5 to FIG. 8, the system cache architecture for supporting a multiprocessor architecture can provide minimal interrupts of multiple processor clusters with multiple processor kernels in each processor cluster, and the snooping pipeline switch can achieve short memory latency for symmetrical multiprocessing task execution.

A chip is further provided according to an embodiment of the present application, the chip includes at least two chiplets and a system cache architecture for supporting a multiprocessor architecture, the at least two chiplets are connected to a coherent interconnect by the system cache architecture for supporting a multiprocessor architecture. The system cache architecture for supporting a multiprocessor architecture is the system cache architecture for supporting a multiprocessor architecture according to the embodiments shown in FIG. 2 to FIG. 4.

A processor cluster assembly is further provided according to an embodiment of the present application, which includes a processor cluster composed of at least two processors and a system cache architecture for supporting a multiprocessor architecture, and the at least two processors are connected to a coherent interconnect by the system cache architecture for supporting a multiprocessor architecture as shown in the embodiments corresponding to FIG. 2 to FIG. 4.

In general, the various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing apparatuses, although the application is not limited thereto.

The embodiments of the present application can be implemented by a data processor of a computer apparatus executing computer program instructions, for example, in a processor entity, or by hardware, or by a combination of software and hardware. The computer program instructions may be assembly instructions, instruction set architecture (ISA) instructions, machine instructions, machine-dependent instructions, microcode, firmware instructions, state setting data, or source or object codes written in one programming language or any combination of more programming languages.

The block diagrams of any logic flows in the drawings of the present application may represent program steps, or may represent interconnected logic circuits, modules and functions, or may represent a combination of program steps and logic circuits, modules and functions. Computer programs can be stored on a memory. The memory may be of any type suitable for the local technical environment and may be implemented by using any suitable data storage technology, such as but not limited to read-only memory (ROM), random access memory (RAM), optical storage devices and systems (digital video disc (DVD) or compact disc (CD)), etc. Computer readable media may include non-transitory storage media. The data processor can be any type suitable for the local technical environment, such as but not limited to general purpose computer, special purpose computer, microprocessor, digital signal processor (DSP), application specific integrated circuit (SAIC), programmable logic device (field-programmable gate array, FGPA), and processor based on a multi-core processor architecture.

What is claimed is:

1. A system cache architecture for supporting a multiprocessor architecture, comprising:
    a snooping pipeline switch, at least two cache segments, a memory request arbiter and a coherent interconnect snooping requester; wherein
    the snooping pipeline switch is connected to a last level memory bus of at least two processors of the multiprocessor architecture and is configured to forward a memory read or write request from any processor to a memory system by means of the memory request arbiter or send the memory read or write request to any one of the at least two cache segments;
    the memory request arbiter is connected to the memory system by a coherent interconnect;
    the coherent interconnect snooping requester is connected to a direct memory access (DMA) master by the coherent interconnect, and is configured to send snooping read and write requests from the DMA master to any cache segment of the at least two cache segments; and
    the at least two cache segments are configured to in response to concurrent read and write requests from the snooping pipeline switch or from the coherent interconnect snooping requester, and store cached data corresponding to the memory read and write requests or the snooping read and write requests; and
    to, when the cached data corresponds to a memory read and write request of the memory read and write requests or a snooping read and write request of the snooping read and write requests, feed back the cache data corresponding to the memory read and write requests or the snooping read and write requests to the processor that sends the memory read and write requests, or the DMA master that sends the snooping read and write requests or update stored cached data on the corresponding cache segment.

2. The system cache architecture according to claim 1, wherein the snooping pipeline switch is further configured to, before forwarding the memory read or write request from any processor to the memory system by means of the memory request arbiter or sending the memory read or write request to any cache segment of the at least two cache segments, determine whether the memory read or write request is in a cacheable cycle; and in a case where the memory read or write request is in a cacheable cycle, send the memory read or write request to any cache segment of the at least two cache segments, or in a case where the memory read or write request is not in the cacheable cycle, forward the memory read and write request to the memory system by means of the memory request arbiter.

3. The system cache architecture according to claim 2, wherein each cache segment comprises a cache, a dual-ported cache tag segment, a processor cache controller and a snooping controller; and
    the cache is configured to store data, the dual-ported cache tag segment is configured to assign different cache tags for data from the snooping pipeline switch or data from the coherent interconnect snooping requester, the processor cache controller is configured to control a data request from the snooping pipeline switch, and the snooping controller is configured to control data requests from the coherent interconnect snooping requester.

4. The system cache architecture according to claim 1, wherein in a case where the memory read or write request is a memory read request, the snooping pipeline switch is further configured to query, according to the memory read request from a first processor, corresponding first cached data in the first cache segment; in a case where a cache miss occurs, the snooping pipeline switch is further configured to acquire the corresponding first cached data from the memory system by means of the memory request arbiter and send the corresponding first cached data to the first processor and store the corresponding first cached data into the first cache segment, or in a case where a cache hit occurs, the snooping pipeline switch is further configured to snoop dirty data corresponding to the first cached data from other processors other than the first processor, and in response to the dirty data being detected, send the dirty data to the first processor and refresh data in the first cache segment,
    wherein the first processor is any processor in the multiprocessor architecture, and the first cache segment is any idle cache segment of the at least two cache segments.

5. The system cache architecture according to claim 4, wherein in a case where when the first cached data corresponding to the memory read request is queried in the first cache segment, the cache hit occurs and the dirty data corresponding to the first cached data is not detected from other processors other than the first processor, the snooping pipeline switch is further configured to send the first cached data in the first cache segment to the first processor.

6. The system cache architecture according to claim 5, wherein each cache segment comprises a cache, a dual-ported cache tag segment, a processor cache controller and a snooping controller; and the cache is configured to store data, the dual-ported cache tag segment is configured to assign different cache tags for data from the snooping pipeline switch or data from the coherent interconnect snooping requester, the processor cache controller is configured to control a data request from the snooping pipeline switch, and the snooping controller is configured to control data requests from the coherent interconnect snooping requester.

7. The system cache architecture according to claim 4, wherein each cache segment comprises a cache, a dual-ported cache tag segment, a processor cache controller and a snooping controller; and the cache is configured to store data, the dual-ported cache tag segment is configured to assign different cache tags for data from the snooping pipeline switch or data from the coherent interconnect snooping requester, the processor cache controller is configured to control a data request from the snooping pipeline switch, and the snooping controller is configured to control data requests from the coherent interconnect snooping requester.

8. The system cache architecture according to claim 1, wherein in a case where the memory read or write request is a memory write request:

in response to determining the memory write request to be a partial write request, the snooping pipeline switch is further configured to store the memory write request in the first cache segment, send a snooping request to other processors other than the first processor to prevent other processors from updating a cache line in which the memory write request is located, and forward the memory write request to the memory system by means of the memory request arbiter; or in response to determining the memory write request to be a full write request, the snooping pipeline switch is configured to directly forward the memory write request to the memory system by means of the memory request arbiter.

9. The system cache architecture according to claim 8, wherein the snooping pipeline switch is further configured to, after forwarding the memory write request to the memory system by means of the memory request arbiter, mark the memory write request stored in the first cache segment as dirty data.

10. The system cache architecture according to claim 8, wherein each cache segment comprises a cache, a dual-ported cache tag segment, a processor cache controller and a snooping controller; and the cache is configured to store data, the dual-ported cache tag segment is configured to assign different cache tags for data from the snooping pipeline switch or data from the coherent interconnect snooping requester, the processor cache controller is configured to control a data request from the snooping pipeline switch, and the snooping controller is configured to control data requests from the coherent interconnect snooping requester.

11. The system cache architecture according to claim 1, wherein in a case where the snooping read or write request is a snooping read request, the first cache segment is configured to, after receiving the snooping read request, determine whether a cache hit occurs for the snooping read request, and in response to a cache miss occurring for the snooping read request, not respond to the snooping read request.

12. The system cache architecture according to claim 11, wherein the first cache segment is further configured to, when receiving the snooping read request and determining that the cache hit occurs for the snooping read request, determine whether second cached data corresponding to the snooping read request is dirty data, and in response to determining that the second cached data corresponding to the snooping read request is dirty data, feed back the second cached data and mark the second cached data as clean data; and in response to determining that the second cached data stored in the first cache segment is not dirty data, the first cache segment is further to check, by means of the snooping pipeline switch, dirty data corresponding to the snooping read request in the at least two processors and cache and feed back the dirty data.

13. The system cache architecture according to claim 12, wherein the first cache segment is further configured to, when receiving the snooping read request, determining that the cache hit occurs for the snooping read request and determining that the second cached data corresponding to the snooping read request is clean data, feed back the second cached data in case where dirty data corresponding to the snooping read request is not detected in the at least two processors by means of the snooping pipeline switch.

14. The system cache architecture according to claim 1, wherein in the case where the snooping read or write request is a snooping write request, the first cache segment is configured to, after receiving the snooping write request, determine whether a cache hit occurs for the snooping read request, and in response to determining that a cache miss occurs for the snooping write request, write the snooping write request into the memory system directory.

15. The system cache architecture according to claim 14, wherein the first cache segment is further configured to, when receiving the snooping write request and determining that the cache hit occurs for the snooping read request, in response to determining that the snooping write request is dirty data hit, write snooping write request into the memory system directory; or in response to determining that the snooping write request is clean data hit, send the snooping write request to the at least two processors by means of the snooping pipeline switch.

16. The system cache architecture according to claim 15, wherein the first cache segment is further configured to, after writing the snoop write request into the memory system directory or sending the snoop write request to the at least two processors in response to determining that the cache hit occurs for the snooping read request, invalidate the hit cache line.

17. The system cache architecture according to claim 1, wherein each cache segment comprises a cache, a dual-ported cache tag segment, a processor cache controller and a snooping controller; and the cache is configured to store data, the dual-ported cache tag segment is configured to assign different cache tags for data from the snooping pipeline switch or data from the coherent interconnect snooping requester, the processor cache controller is configured to control a data request from the snooping pipeline switch, and the snooping controller is configured to control data requests from the coherent interconnect snooping requester.

18. The system cache architecture according to claim 1, wherein the multiprocessor architecture is a processor cluster comprising a plurality of processors, or the multiprocessor architecture is a die-to-die interconnected structure comprising a plurality of CPU chiplets.

19. A chip, comprising at least two chiplets and a system cache architecture for supporting a multiprocessor architecture, wherein the at least two chiplets are connected to a coherent interconnect by the system cache architecture, wherein the system cache architecture comprises:
 a snooping pipeline switch, at least two cache segments, a memory request arbiter and a coherent interconnect snooping requester; wherein
 the snooping pipeline switch is connected to a last level memory bus of at least two processors of the multiprocessor architecture and is configured to forward a memory read or write request from any processor to a memory system by means of the memory request arbiter or send the memory read or write request to any one of the at least two cache segments;
 the memory request arbiter is connected to the memory system by the coherent interconnect;
 the coherent interconnect snooping requester is connected to a direct memory access (DMA) master by the coherent interconnect, and is configured to send snooping read and write requests from the DMA master to any cache segment of the at least two cache segments; and
 the at least two cache segments are configured to in response to concurrent read and write requests from the snooping pipeline switch or from the coherent interconnect snooping requester, and store cached data corresponding to the memory read and write requests or the snooping read and write requests; and
 to, when the cached data corresponds to a memory read and write request of the memory read and write requests or a snooping read and write request of the snooping read and write requests, feed back the cache data corresponding to the memory read and write requests or the snooping read and write requests to the processor that sends the memory read and write requests, or the DMA master that sends the snooping read and write requests or update stored cached data on the corresponding cache segment.

20. A processor cluster assembly, comprising a processor cluster comprising at least two processors and the system cache architecture for supporting a multiprocessor architecture, wherein the at least two processors are connected to a coherent interconnect by the system cache architecture, wherein the system cache architecture comprises:
 a snooping pipeline switch, at least two cache segments, a memory request arbiter and a coherent interconnect snooping requester; wherein
 the snooping pipeline switch is connected to a last level memory bus of at least two processors of the multiprocessor architecture and is configured to forward a memory read or write request from any processor to a memory system by means of the memory request arbiter or send the memory read or write request to any one of the at least two cache segments;
 the memory request arbiter is connected to the memory system by the coherent interconnect;
 the coherent interconnect snooping requester is connected to a direct memory access (DMA) master by the coherent interconnect, and is configured to send snooping read and write requests from the DMA master to any cache segment of the at least two cache segments; and
 the at least two cache segments are configured to in response to concurrent read and write requests from the snooping pipeline switch or from the coherent interconnect snooping requester, and store cached data corresponding to the memory read and write requests or the snooping read and write requests; and
 to, when the cached data corresponds to a memory read and write request of the memory read and write requests or a snooping read and write request of the snooping read and write requests, feed back the cache data corresponding to the memory read and write requests or the snooping read and write requests to the processor that sends the memory read and write requests, or the DMA master that sends the snooping read and write requests or update stored cached data on the corresponding cache segment.

* * * * *